(12) United States Patent
Mueller et al.

(10) Patent No.: US 6,560,539 B1
(45) Date of Patent: May 6, 2003

(54) METHOD AND DEVICE FOR DETERMINING A VALUE REPRESENTING THE SPEED OF A VEHICLE

(75) Inventors: Elmar Mueller, Markgroeningen (DE); Friedrich Kost, Kornwestheim (DE); Gebhard Wuerth, Sulzbach-Laufen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/402,182

(22) PCT Filed: Mar. 13, 1998

(86) PCT No.: PCT/DE98/00749
§ 371 (c)(1),
(2), (4) Date: Feb. 7, 2000

(87) PCT Pub. No.: WO98/44353
PCT Pub. Date: Oct. 8, 1998

(30) Foreign Application Priority Data

Mar. 29, 1997 (DE) .......................................... 197 13 251

(51) Int. Cl.⁷ ................................................. G01P 3/00
(52) U.S. Cl. ........................... 702/14; 701/74; 303/163
(58) Field of Search ........................... 702/148; 701/74, 701/75, 71; 303/139, 183, 169, 173, 163, 121

(56) References Cited

U.S. PATENT DOCUMENTS

| 4,675,819 A | 6/1987 | Fennel |
| 4,818,037 A | 4/1989 | McEnnan |
| 5,272,634 A | * 12/1993 | Leibbrand et al. .......... 303/173 |
| 5,429,428 A | * 7/1995 | Yasuda ........................ 180/197 |

FOREIGN PATENT DOCUMENTS

| DE | 38 33 212 | 4/1990 |
| DE | 39 17 976 | 12/1990 |
| DE | 40 09 195 | 9/1991 |
| DE | 43 14 830 | 11/1994 |

OTHER PUBLICATIONS

FDR–The Driving Dynamics Control of Bosch, Automotive Technical Journal (ATZ) 96, 1994, vol. 11, pp. 674–689. Described in Specification.

* cited by examiner

Primary Examiner—Bryan Bui
Assistant Examiner—Hien Vo
(74) Attorney, Agent, or Firm—Kenyon & Kenyon

(57) ABSTRACT

A method and device that determines a quantity describing a speed of a vehicle. In this method, for at least two wheels, the speeds of these wheels are ascertained, and the quantity describing the speed of the vehicle is ascertained at least as a function of the speed of one selected wheel. The selection of the wheel required for determining the quantity describing the speed of the vehicle takes place at least as a function of an operating state of the vehicle, which is described at least by the speeds of at least two wheels or the quantity ascertained as a function at least of these speeds.

14 Claims, 4 Drawing Sheets

| | Antriebsfall | Bremsfall | Sonstige Fälle |
|---|---|---|---|
| vs4, vs3, vs2, vs1, vref | A11 | A12 | A13, A14 |
| vs4, vs3, vs2, vref, vs1 | A21 | A22 | A23, A24 |
| vs4, vs3, vref, vs2, vs1 | A31 | A32 | A33, A34 |
| vs4, vref, vs3, vs2, vs1 | A41 | A42 | A43, A44 |
| vref, vs4, vs3, vs2, vs1 | A51 | A52 | A53, A54 |

FIG. 4

METHOD AND DEVICE FOR DETERMINING A VALUE REPRESENTING THE SPEED OF A VEHICLE

FIELD OF THE INVENTION

The present invention relates to a method and a device for determining a quantity describing the speed of a vehicle.

BACKGROUND INFORMATION

Methods and devices for determining a quantity describing the speed of a vehicle are known from the Prior Art in a multitude of modifications.

In German Published Patent Application No. 38 33 212 (U.S. Pat. No. 5,272,634), the formation of a reference quantity for the vehicle speed outside of a brake force regulator is described for a vehicle having two-wheel drive and furnished with an anti-lock control system. Essentially, in this context, based on the speeds of the two driven wheels, an average wheel speed is ascertained. If the temporal derivation of this averaged wheel speed is greater than zero, then the reference quantity is determined by the speed of the slower of the two driven wheels. If the temporal derivation of this averaged wheel speed is smaller than zero, then the reference quantity is determined by the speed of the faster of the two driven wheels. In this context, the increase of the reference quantity for the vehicle speed is limited by a maximum value.

German Published Patent Application No. 40 09 195 (U.S. Pat. No. 5,364,174) describes the formation of a reference speed required for the slip control of an anti-lock control system installed in a four-wheel-drive vehicle. Essentially, in this context, the reference speed, in response to an increase in speed, is determined by the speed of the slowest wheel and, in response to a decrease in speed, is determined by the speed of the third-fastest wheel. In the transitional area between increase and decrease, the obtained value of the slowest wheel speed is kept constant. In the event that the speed of the third-fastest wheel deviates too greatly from an auxiliary reference speed, the reference speed is maintained parallel to this auxiliary reference speed. The auxiliary reference speed is formed by being raised by the speed of the third-fastest wheel and by being lowered by the speed of the fastest wheel. It too is kept constant in a transitional range. In the event of instability caused by a locking tendency, the rise of the reference speed is determined by the rise of the auxiliary reference speed. If the wheels make a complete revolution, the reference speed is kept constant and the increase of the auxiliary reference speed is limited to a physically possible vehicle acceleration. If the rear wheels of the four-wheel-drive vehicle are decoupled from the drive in response to braking, a slightly modified formation of the reference speed is used. Apart from the control, the reference speed is increased if the speeds of all wheels are greater than it. If two or three wheels are faster than the reference speed, then it is kept constant. If none or only one of the wheels is faster than the reference speed, then the reference speed is adjusted downwards.

In German Published Patent Application No. 43 14 830 A1 a method is described for determining the reference speed of a vehicle. For this purpose, the wheel circumference speeds, the vehicle longitudinal acceleration, and the vehicle transverse acceleration are ascertained. Various driving situations are distinguished for the vehicle as a function of the vehicle longitudinal acceleration and the vehicle transverse acceleration. As a function of the respective driving situation, a group of wheel speeds is selected, the reference speed being formed from the selected wheel speeds. In the driving situation "braking general," the reference speed is calculated as the amount the highest wheel circumference speed of all four wheels. In the driving situation "accelerations, steady driving, engine thrust operation," the reference speed is generated as the arithmetic average of the wheel circumference speeds of the wheels that are not driven. In the driving situations "braking on a left curve" and "braking on a right curve," the wheels having the greatest load are determinative for the reference speed.

German Published Patent Application No. 39 17 976 describes a method for determining the vehicle speed in a motor vehicle having rear-engine drive. For this purpose, the angular speeds of the front wheels and at least the average angular speed of the two rear wheels of the vehicle are measured. In addition, the acceleration of the vehicle is determined at least roughly in the vehicle's longitudinal direction. In response to a positive acceleration of the vehicle, the vehicle speed is calculated using the angular speed of at least one of the front wheels. In response to a strong deceleration of the vehicle, the vehicle speed is calculated using the greatest angular speed of the individual wheels of the vehicle.

The aforementioned German Published Patent Application No. 38 33 212 describes an anti-lock control system that contains a slip control. In the context of this slip control system, a reference quantity must be created. The magnitude of the reference quantity is determined, in each case, only by one of the wheel speeds of the driven wheels. For this purpose, the average value of the two wheel speed signals of the driven wheels is ascertained. If the rise of this average value is greater than zero, then the magnitude of the reference quantity is determined by the wheel speed signal of the slower wheel. If the rise of this average value is less than zero, then the magnitude of the reference quantity is determined by the wheel speed signal of the faster wheel.

Systems for controlling brake slip and drive slip are generally known, for example, from the book published by Robert Bosch GmbH Stuttgart, "Brake Systems For Automobiles", VDI Printing House, Duesseldorf, first edition, 1994.

Systems for controlling a quantity describing the driving dynamics of a vehicle are, for example, described in the publication "FDR—The Driving Dynamics Control of Bosch," in *Automotive Technical Journal* (ATZ) 96, 1994, volume 11, on pages 674 through 689.

SUMMARY OF THE INVENTION

An objective of the present invention is a more precise determination of a quantity describing the speed of a vehicle.

This is achieved with a method for determining a quantity describing the speed of a vehicle using the motion characteristics of the vehicle and the wheel performance. The advantage of the method and the device of the present invention over conventional methods and devices is that the quantity describing the speed of the vehicle according to the present invention can be ascertained for a vehicle according to the present invention having any drive system, i.e., for a front-wheel-drive, back-wheel-drive, or four-wheel-drive vehicle for any given operating state of the vehicle. In this context, the determination of the quantity describing the vehicle speed does not depend on whether, during the determination, the control system implemented in the vehicle is active in the sense of a brake slip control or a drive slip control, or in the sense, for example, of a control system superordinated to the brake or drive slip control for controlling a quantity describing the driving dynamics of the vehicle.

Heretofore, for the varied vehicle drive concepts and for every type of slip control system that has been used in a vehicle, it was necessary to have a separate method and a separate device for determining the quantity describing the speed of the vehicle. With the method of the present invention and with the device of the present invention, there is now a method and a device which can be used for every type of slip control system.

The universal applicability of the method of the present invention and thus also of the device of the present invention rests, first, on the fact that the quantity describing the speed of the vehicle is formed on the basis of an advantageously selected baseline, which takes into account a component describing the speed of the vehicle and a component describing the acceleration of the vehicle. Second, it rests on the fact that at the time of the formation of the quantity describing the speed of the vehicle, the current operating state of the vehicle is ascertained, and that, as a function of this operating state, that wheel of the vehicle is selected which is most suitable for the determination of the quantity describing the speed of the vehicle at this time period and in this operating state of the vehicle.

The operating state of the vehicle is advantageously determined at least as a function of the speeds ascertained for at least two wheels of the vehicle and at least as a function of a quantity determined at least as a function of these speeds.

In the event of the first dependency, mentioned above, involved in the determination of the operating state of the vehicle, it is particularly advantageous if the speeds of the at least two wheels are sorted according to their magnitude and the quantity describing the speed of the vehicle is compared with the sorted speeds. In the event of the second dependency, mentioned above, it is possible to use a quantity describing the acceleration of the vehicle, included in which quantity are, apart from the speeds of the at least two wheels, in addition at least the quantities characterizing the state of the engine. In the event of the second dependency, by using a second quantity ascertained at least as a function of the state of the engine, a refinement with regard to the division of the operating states can be achieved. On the basis of the vehicle operating states ascertained in this way, a decision with regard to the wheel to be selected is possible.

The speed of the wheel ascertained for the respective vehicle operating state is taken into account the component describing the speed of the vehicle and in the formation of the component describing the acceleration of the vehicle. It has proven, in this context, to be advantageous to evaluate the speed of the selected wheel in each case using a factor ascertained likewise at least as a function of the operating state of the vehicle. As a result of the factors, the extent is determined to which the wheel selected for the specific operating state has played a role in the formation of the quantity describing the speed of the vehicle.

It is advantageous if, in determining the component describing the acceleration of the vehicle, in addition, at least a quantity is taken into account that is determined at least as a function of quantities characterizing the state of the engine and the brake pressures acting on the individual wheels.

At least for a portion of the operating states of the vehicle, it is advantageous to refine the determination of the selected wheel and the determination of the factors required for the evaluation of the speed of the selected wheel by using plausibility queries within the appropriate operating state.

The plausibility queries can, for example, be carried out as a function of the speeds of the wheels or the quantities describing the slip values of the individual wheels.

A further advantage of the method and the device according to the present invention rests in the fact that, proceeding from the known slip control systems, essentially no additional sensor equipment is required. Thus the method and the device according to the present invention can, for example, fall back on the sensors present, in any case, in slip control systems for determining the wheel speed of the individual wheels.

Further advantages as well as advantageous refinements can be derived from the subordinate claims, the drawing, as well as the description of the exemplary embodiment.

BRIEF DESCRIPTION OF THE DRAWINGS

FIG. 4 illustrates a schematic representation of a determination of various operating states of a vehicle according to the present invention.

DETAILED DESCRIPTION

Figure 1:
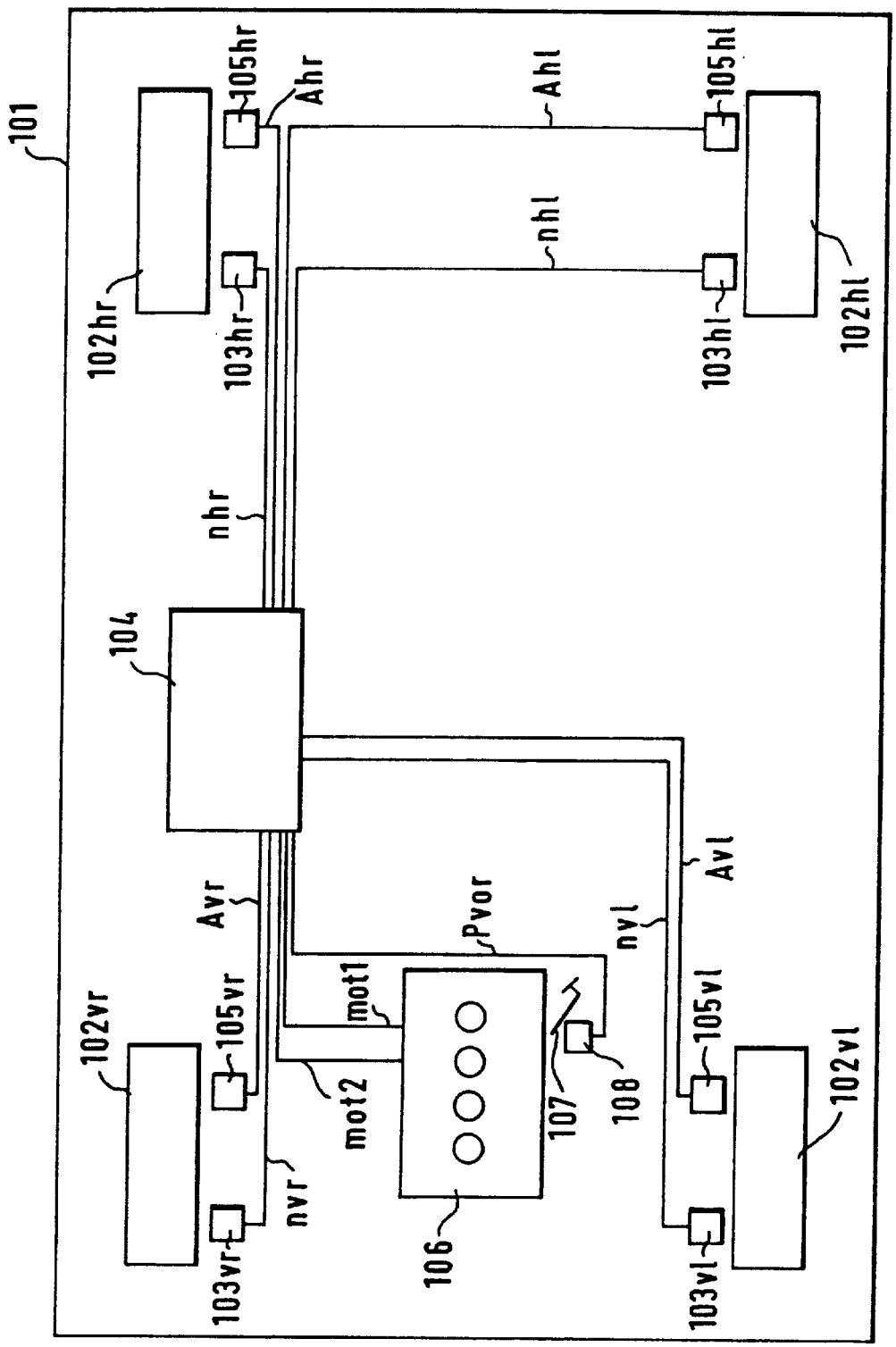
FIG. 1 illustrates a vehicle furnished with a slip control system, in which a method and a device according to the present invention are implemented.

The present invention is directed to systems according to which, for example, the brake slip or the drive slip of the wheels of a vehicle can be influenced. This should, of course, represent no limitation of the idea in the present invention. The method and the device of the present invention can, for example, also be used in a system for controlling a quantity describing the driving dynamics of the vehicle, in particular the yaw angle speed of the vehicle. However, for this purpose, proceeding from FIG. 1, the vehicle must be furnished with additional sensor devices.

In systems for controlling the brake slip, for controlling the brake slip as is usual in the known manner, the braking torques acting on the individual wheels are varied by activating the brakes. In systems for controlling the drive slip, the drive slip of the wheels is customarily adjusted by generating a braking torque of individual wheels or by influencing the drive torque produced by the engine. For systems for regulating the braking and/or drive slip, the same applies for the adjustment of the corresponding slips. In systems for controlling a quantity describing the driving dynamics of the vehicle, the braking torques required for controlling the respective slip can usually be individually adjusted for the respective wheels, independently of the driver. Additionally, the drive torque produced by the engine is influenced, for example, along the lines of a drive torque control.

To begin with, the problems of determining a quantity describing the speed of a vehicle will be discussed, the quantity being designated in the further discussion as the reference speed of the vehicle.

On the other hand, until now, it was necessary that every type of slip control system that was used in a vehicle have its own system, for example, its own method and its own device for determining the reference speed of the vehicle.

So, for example, in a brake slip control a different system was employed than in a drive-slip regulator.

Similarly, for the varying vehicle drive systems it was necessary, in each case, to have a different system for the determination of the reference speed of the vehicle. Thus, for example, the system for a two-wheel drive vehicle is different from that of a four-wheel-drive vehicle. In a two-wheel drive vehicle, for determining the reference speed of the vehicle, recourse may be had, in the driven case [when the wheels are driven], to the wheels that are not driven, since they as free-rolling wheels are normally slip-free. In contrast to this, in a four-wheel-drive vehicle, the selection of the suitable wheel or wheels is more difficult because, in the normal case, all of the wheels of a four-wheel-drive vehicle are subject to slip.

The method and the device according to the present invention represent a system for which the reference speed of the vehicle, for a vehicle with any sort of drive, can be ascertained for any operating state of the vehicle. In this context, for example, in the operating state, any control intervention of any slip control can be carried out.

FIG. 1 depicts a vehicle 101 having wheels 102$vr$, 102$vl$, 102$hr$, and 102$hl$. Below, simplifying notation 102$ij$ is introduced for the wheels of the vehicle. In this context, index I indicates whether the wheel is located on rear axle (h) or on front axle (v). Index j indicates the assignment to right (r) or to left (l) vehicle side. This designation of using the two indices I and j is valid for all quantities and components in which it is used.

A wheel speed sensor 103$ij$ is assigned to each wheel 102$ij$. Signal nij produced by each wheel speed sensor 103$ij$ is fed to control unit 104 for further processing. In addition, actuators 105$ij$ are assigned to wheels 102$ij$, the actuators making it possible to adjust the braking torque acting on the individual wheels. Actuators 105$ij$ are, for example, valves to modulate the wheel brake cylinder pressure.

In addition, the vehicle includes an engine 106. From engine 106, engine data mot1 are fed to control unit 104. Also, the vehicle has a brake pedal 107 that can be actuated by the driver. Using a sensor 108, the initial pressure, adjusted by the driver in the braking circuit by actuating brake pedal 107, can be ascertained. The initial pressure ascertained by sensor 108 is conveyed to control unit 104 as signal Pvor.

In control unit 104, the signals fed to it are processed and evaluated. Various actuating signals are generated in accordance with the regulation implemented in the control unit. It is conceivable that control unit 104 produces actuating signals Aij, using which actuators 105$ij$ assigned to wheels 102$ij$ are driven for adjusting the braking torques. In addition, the output of an actuating signal mot2 is conceivable, with which the drive torque produced by engine 106 can be influenced.

The sensor device described in connection with FIG. 1 essentially represents the necessary sensor device for the method and the device of the present invention.

If the vehicle is furnished with a system for controlling the brake slip and the drive slip, then wheel speed sensors 103$ij$ are already present on the basis of these systems. Depending on which of the two systems the vehicle is furnished with, a corresponding means for recording engine data mot1 and a corresponding sensor 108 are necessary.

If the vehicle is furnished with a system for controlling the quantity representing the driving dynamics of the vehicle, in particular the yaw angle speed of the vehicle, then on the basis of the sensors depicted in FIG. 1 at least one rotational rate and yaw rate sensor and/or one transversal acceleration sensor as well as a steering angle sensor are necessary.

Figure 2:
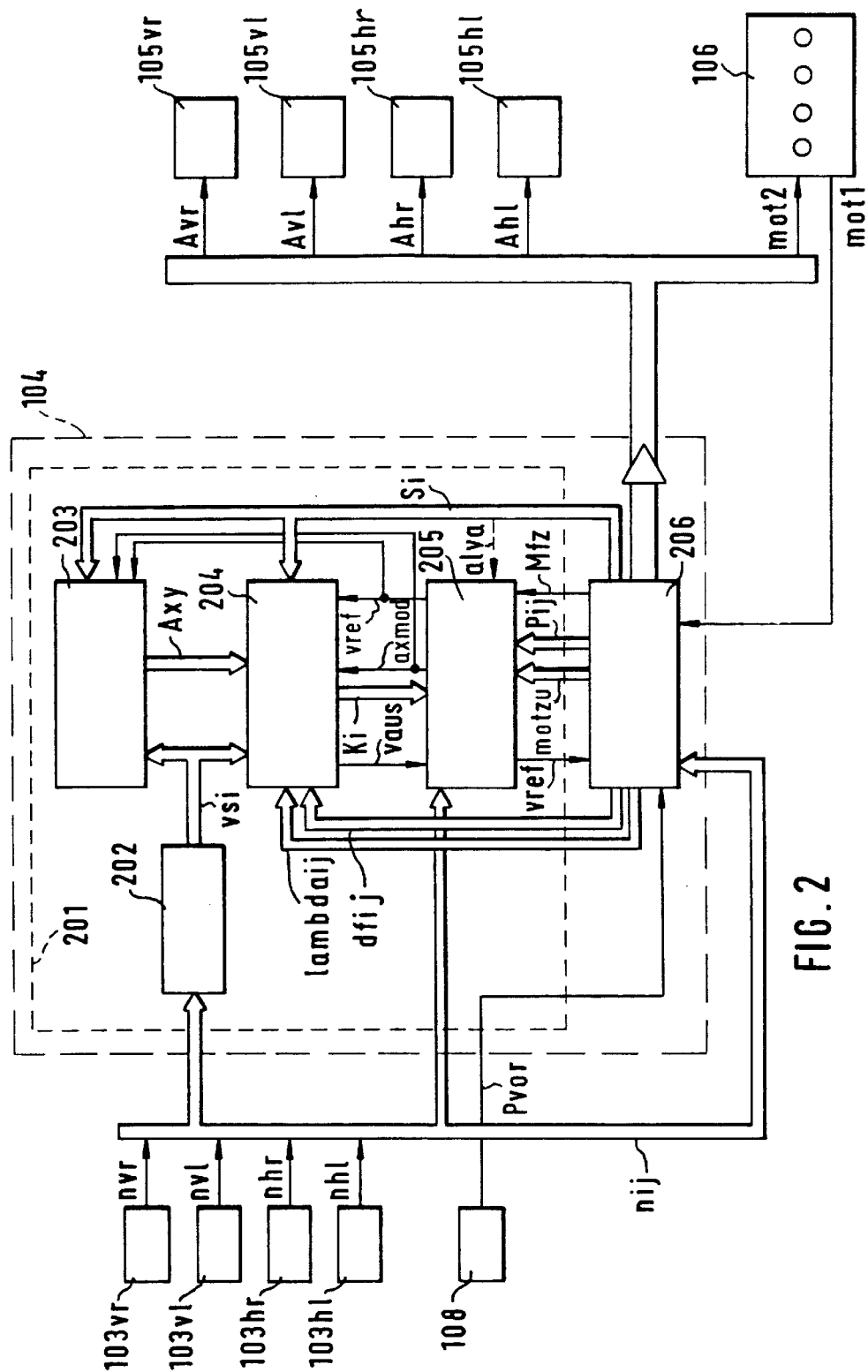
FIG. 2 illustrates a sensor apparatus and a structure of a control unit according to the present invention.

Before FIG. 2 is discussed, the starting point underlying the method of the present invention for determining the reference speed of the vehicle should be presented.

The determination of the reference speed of the vehicle is based on two mechanisms independent of each other.

The current value of the reference speed of the vehicle is ascertained using a first mechanism, model-based on the connection between the principle of angular momentum for a wheel of the vehicle and the principle of linear momentum for the vehicle.

The principle of angular momentum for a wheel of the vehicle, which is established using the two indices I and j, is described, for example, in the equation:

$$Fij=(Cp \times Pij)-Mij/Rij+(Jij/Rij)(d(Vij)/dt). \quad (1)$$

is In this context, the following correspondence applies in equation (1): Quantity Fij corresponds to the wheel force acting upon the respective wheel. Quantity Pij corresponds to the pressure obtained in the respective wheel brake cylinder. This wheel brake cylinder can, for example, be ascertained using pressure sensors, for which purpose an appropriate sensor is allocated to each wheel. Alternatively, the wheel brake cylinder pressure can also be ascertained in a generally known manner, using a hydraulic model, as can be seen, for example, in the above-mentioned article published in the Automotive Technical Journal (ATZ). Fed to the hydraulic model, in this context, is a value for the initial pressure adjusted by the driver in the braking circuit, as well as values for the trigger times of the actuators assigned to the respective wheel. In the present exemplary embodiment, initial pressure Pvor, adjusted by the driver in the braking circuit, is ascertained using sensor 108. The values for the trigger times of the actuators assigned to the respective wheel are ascertained, in the present exemplary embodiment, in a block 206. In this alternative, for the determination of the wheel brake cylinder pressures, pressure sensors assigned to the wheels are necessary. Quantity Mij corresponds to the wheel-specific Cardan torque. This wheel-specific Cardan torque, in the present exemplary embodiment, is ascertained on the basis of the quantities designating the state of the engine. Among the quantities characterizing the state of the engine are at least the moment of inertia of the engine, the rotational torque produced by the engine and the drive torque, as well as the engine speed. The moment of inertia of the engine can be ascertained empirically in preliminary tests. The engine speed is to be ascertained, in the present exemplary embodiment, using a known sensor, which is therefore not described further. The torque produced by the engine is ascertained on the basis of the engine speed. Quantity vij represents the speed of the respective wheel. It is ascertained in block 205 from signal nij, which is ascertained using corresponding wheel rotation sensor 103$ij$. Quantity Cp, which denotes a braking parameter representing the brake system, is ascertained empirically in the preliminary stage as is quantity Jij, which represents the moment of inertia in the corresponding wheel. Quantity Rij, which represents the radius of the respective wheel, can be ascertained empirically in the preliminary stage for all wheels.

In the event that the quantities characterizing the state of the engine, by which the drive state and/or the drive forces of the vehicle can be described, are not available, wheel forces Fij acting on the wheels are described, on the basis of equation (1), by the equation:

$$Fij = Cp \times Pij. \quad (1')$$

For example, in this case, only the braking forces acting on the individual wheels are described by quantities Fij.

The quantities characterizing the state of the engine are, for example, not available if either the sensor for determining the engine speed is defective or when the data transmission system, with which, for example, the data ascertained by the sensors is fed to the individual blocks, is defective.

The principle of linear momentum for a vehicle is, for example, described by the equation:

$$axmod = (\Sigma fij + Fwind)/Mfz. \quad (2)$$

In equation (2), in this context, the following correspondence obtains: quantity axmod represents the acceleration of the vehicle. Term ΣFij represents the total of all wheel forces. These are ascertained with the assistance of equation (1). Using quantity Fwind, the influence of air resistance is taken into account. Quantity Mfz represents the mass of the vehicle. For this quantity, for example, a fixedly preestablished value is used, which has been empirically ascertained. It is similarly conceivable to measure the value of quantity Mfz using known estimation algorithms during the driving operation of the vehicle.

In the determination of quantity axmod, it is under certain circumstances expedient to take into account the lateral component. This can, for example, take place in that, in response to a small oblique motion, there is no or little reduction, and in response to a large oblique motion, on the other hand, there is a strong reduction of quantity axmod, as a function of the oblique motion of the front axle. The oblique motion of the front axle, for example, can be estimated by an observer. For this purpose, as input quantities, at least the vehicle speed and the transversal acceleration of the vehicle are required. The transversal acceleration can be ascertained, in a familiar manner, for example, using a suitable sensor. The reduction of quantity axmod as a result of the functional relation between the oblique motion of the front axle and the reducing factor, represents a storage-space-optimized possibility for taking into account the influence of lateral component forces. Of course, the physical values can also be ascertained taking into account the lateral component forces and the oblique motion rigidities.

Equation (2) is generically valid. In the event that the quantities characterizing the state of the engine are available, wheel forces Fij, ascertained in accordance with equation (1), are introduced into term ΣFij.

In the event that the quantities characterizing the state of the engine are not available, wheel forces Fij ascertained in accordance with equation (1') are introduced into term ΣFij. The consequence is that for a braked vehicle the equation (2) remains unchanged in its form. In this context, wheel forces Fij correspond to the brake forces acting on the respective wheel, even to the possibility of a drag torque. For an accelerated vehicle, equation (2) is reduced to axmod= Fwind/Mfz, since in this case wheel forces Fij are equal to zero.

Since quantity axmod, inter alia, is introduced into the description of the operating state of the vehicle, a signal must be made available with which the block in which the operating state of the vehicle is ascertained is informed about the state of quantity axmod. This means that the signal must contain information as to whether quantity axmod is completely described, or whether quantity axmod is only partially described due to the unavailability of the quantities characterizing the state of the engine, and therefore the quantity cannot be used in the determination of the operating state of the vehicle. The signal will be discussed in greater detail in connection with the description of blocks 203 and 206 as well as of FIG. 4.

On the basis of a vehicle acceleration axmod ascertained using equation (2), the reference speed of the vehicle is formed using the equation $$vref(n) = vref(n-1) + axmod(n) + axoff(n). \quad (3)$$

In equation (3), term vref(n) represents the value for current temporal step n and term vref(n−1) represents a value for previous temporal step n−1 of reference speed vref. Term axmod(n) represents the value of acceleration axmod of the vehicle ascertained using equation (2) for current time step n. Term axoff(n) represents the value of a quantity axoff yet to be described for current time step n.

Using the first mechanism used to measure the reference speed of the vehicle, which is a model-based extrapolation, the determination of the reference speed of the vehicle cannot simply be assured taken by itself. For with this mechanism, influences, such as the slope of the driving surface or the load state of the vehicle or even defective estimated values and sensor signals, remain largely left out of account. For this reason, for the determination of the reference speed of the vehicle, the second mechanism must additionally be brought to bear. Using this second mechanism, one of the wheels of the vehicle is selected and is used for supporting and for determining the reference speed of the vehicle.

The selection of a wheel of the vehicle using the second mechanism is described in detail in connection with FIG. 4. Here, the mode of preceding underlying the second mechanism is to be indicated briefly. Depending on various quantities, such as speeds vij of the wheels, reference speed vref of the vehicle as well as a further quantity ascertained at least as a function of speeds vij describing the acceleration of the vehicle, the operating state of the vehicle is ascertained. Plausibility queries are carried out at least for one part of the operating states ascertained in this manner. At least as a function of these operating states, and if carried out as a function of the plausibility queries, the wheel of the vehicle is ascertained that is best suited at that time point for determining the reference speed of the vehicle.

Proceeding from speed vaus of the selected wheel, quantity axoff for time step n is formed, for example, according to the equation:

$$axoff(n) = axoff(n-1) + koax(vaus(n) - vref(n-1)) \quad (4)$$

Quantity axoff, which represents a quantity describing the acceleration of the vehicle, represents an error correction term for quantity axmod, ascertained using the equation (2).

As equation (4) indicates, the value of term axoff(n) of quantity axoff depends for current time step n on the value of term axoff(n−1) and of a speed difference evaluated using a first factor koax. This speed difference is formed as a function of term vaus(n), which describes the value of speed vaus of the selected wheel at current time step n, and of term vref(n−1), i.e., the value of reference speed vref for time step n−1.

In accordance with the determination of quantity axoff, indicated using the equation (4), this type of determination is also designated as support of quantity axoff by speed vaus of the selected wheel, a corresponding support taking place for the reference speed of the vehicle based on value vref(n) ascertained using the equation (3). This is described, for example, by the equation:

$$vref(n+1) = vref(n) + koax(vaus(n) - vref(n-1)). \quad (5)$$

The value of term vref(n−1), which represents the value of reference speed vref of the vehicle for subsequent time step n+1, depends on the value of term vref(n) and of a speed difference evaluated using a second factor kovx. This speed difference corresponds to the one in equation (4).

Both the value of first factor koax as well as the value of second factor kovx are ascertained, as with the selected wheel, using the second approach. If, on the basis of the plausibility queries, it is discovered that the speed curve of the selected wheel is particularly plausible for supporting the reference speed of the vehicle, then large values are assigned to both factors. If the speed curve of the selected wheel is less plausible, then correspondingly smaller values are assigned to the two factors. If no wheel at all is suitable for the support, then a value of zero is assigned to the two factors. Thus as a result of the two factors, it is established to what degree the selected wheel plays a role in the determination of the reference speed of the vehicle.

Here it should be mentioned that the time-continuous representation selected for the equations (1), (1'), and (2), does not represent a limitation in the further processing of quantities Fij and axmod, ascertained using these equations. The time-discrete values of these quantities acquired in connection with equations (3) through (5) can be made available in the corresponding blocks indicated in FIG. 2.

By inserting equations (3) and (4) into the equation (5), the following representation is produced for the value of reference speed vref of the vehicle for time step n+1:

$$vref(n+1) = [vref(n-1) + kovx(vaus(n) - vref(n-1))] + [axoff(n-1) + axmod(n) + koax(vaus(n) - vref(n-1))] = vvant(n+1) + vaant(n+1). \quad (6)$$

According to equation (6), the determination of the reference speed of the vehicle can be depicted in the following way: value vref(n+1) of the reference speed of the vehicle for time step n+1 can be ascertained as a function of a component vvant (n+1) describing the speed of the vehicle, the first term in square brackets, and as a function of a component vaant(n+1) describing the acceleration of the vehicle, the second term in the square brackets. The first component, which describes the speed of the vehicle, is composed, with reference to time step n+1, of a preceding value for the reference speed of the vehicle and the difference described above and evaluated using a first factor kovx. The second component, which describes the acceleration of the vehicle, is composed of a value of quantity axoff for a preceding time step, of a value of quantity axmod for a preceding time step, and the difference described above, and evaluated using a second factor koax.

If the control system implemented in the vehicle is a system for controlling the brake slip or carries out a brake slip regulation using a superordinated control system, for example, a superordinated control system for controlling a quantity describing the driving dynamics of a vehicle, using a subordinated brake slip controller, then in these cases it is advantageous if in addition to the two mechanisms described above a further one is added. In this further mechanism, an additional support of the reference speed of the vehicle is undertaken as a function of the speed of a wheel. A determination is made for this wheel using this further mechanism in a known manner in so-called adjustment phases using a controlled underbraking of individual wheels, i.e., through a controlled pressure reduction in the wheel brake cylinder of these wheels. In this context, the wheel for which the determination is made in this manner can be different from the one for which the determination is made using the second mechanism.

The reference speed of the vehicle ascertained using the method and the device of the present invention is employed in the above-mentioned control systems, for example, for forming the slip values of the wheels.

FIG. 2 depicts the structure of control unit 104 required for carrying out the method of the present invention and the device of the present invention. Essentially, the control unit is divided into two areas. First area 201 includes the blocks that are essential to the invention. In this context, this refers to blocks 202, 203, 204, and 205. The other area is formed by a block 206, which essentially represents the controller of the implemented control system. In addition, FIG. 2 depicts the sensor mechanism that is essentially required for the method and the device according to the present invention. It can be expanded, as was already mentioned above, by further sensors based on the sensory mechanism of the implemented slip control system.

It should be noted here that the quantities designated in FIG. 2 are not depicted in a time-discrete manner. The time-discrete values for various quantities required in accordance with the equations (3) through (5) are ascertained in the corresponding blocks.

Signals nij generated by wheel speed sensors 103ij, representing the wheel speed of respective wheels 102ij are fed to blocks 202, 205, and 206, which have yet to be described. Similarly, signal Pvor, produced using sensor 108 and representing the initial pressure adjusted by the driver in the braking circuit, is led to block 206.

In block 202 wheel speeds nij are converted into quantities vij representing the speeds of the wheels and are sorted in accordance with their magnitude. Since quantities vij are the internal quantities of block 202, they are not indicated in FIG. 2. Wheel speeds vij sorted according to magnitude are fed as quantities vsi from block 202 to blocks 203 and 204. For quantities vsi sorted according to magnitude, the following correspondence should apply, by way of example: quantity vs1 is the speed of the slowest wheel, i.e., smallest wheel speed vij. Quantity vs2 is the speed of the second-slowest wheel, quantity vs3 is the speed of the second-fastest, and quantity vs4 the speed of the fastest wheel, i.e., highest wheel speed vij. This correspondence can be expressed through the relation vs1<vs2<vs3<vs4.

On the basis of wheel speeds vsi sorted according to magnitude, in block 203 operating states Axy of the vehicle are ascertained and are fed to block 204. In addition to quantities vsi, further quantities such as reference speed vref of the vehicle ascertained in block 205, quantity axmod likewise ascertained in block 205, and signals Si ascertained in block 206 play a role in the ascertaining of operating states Axy. Signals Si contain at least one signal using which, as was mentioned above, block 203 is informed concerning the state of quantity axmod. The determination proceeding in block 203 of operating states Axy is discussed in greater detail in the context of the description of FIG. 4.

In block 204, the following determinations are made based on operating states Axy: on the one hand, the wheel of the vehicle is selected which is used for determining or for supporting the reference speed of the vehicle. On the other hand, factors kovx and koax, already mentioned, are ascertained. Both speed vaus of the selected wheel as well as two factors kovx and koax, both factors being combined in FIG. 2 in the quantity Ki, are fed to block 205.

For selecting the wheel used for the support, determining the reference speed of the vehicle, and determining factors kovx and koax, plausibility queries are carried out at least for one part of operating states Axy in block 204. For one part of operating states Axy, such plausibility queries are nevertheless not necessary since for these operating states, for example, either the selected wheel is stationary from the very beginning due to the operating state, or, based on the operating state, no support of the reference speed using a wheel of the vehicle is expedient.

Other quantities are included in the plausibility queries, apart from wheel speeds vsi sorted according to magnitude. Thus, in this regard, for example, reference speed vref of the vehicle and quantity axmod are fed to block 204, proceeding from block 205. For this purpose, in addition, the slip values of quantities lambdaij describing individual wheels and signals dfij that indicate the failure of individual wheel speed sensors 103ij are fed to block 204. Furthermore, block 204 receives from block 206 signals Si for carrying out the plausibility queries. In this connection, it should be noted that signals Si are a combination of various signals that have yet to be described, and that it can be expedient if various ones of these signals are processed in blocks 203 and 204.

The signals and quantities combined in the designation Si can, for example, contain a quantity, which describes the already mentioned oblique motion of the front axle, or contains signals, which provide information as to whether for the time step in question an engagement of the brake slip control and/or an engagement of the drive slip control and/or an engagement of a superordinate control system is present. In addition, signals Si can contain information concerning the oblique motion of individual wheels or the front axle, the number of controlled wheels, the torque acting on the respective wheel, or the acceleration performance of the vehicle, in particular whether the vehicle in the observed time step is in a transition from deceleration to acceleration. Further signals contained in signals Si are discussed below.

The following queries can, by way of example, be used as plausibility queries: by comparing sorted wheel speeds vsi with each other or with reference speed vref, it can be ascertained whether the wheel speeds are plausible to each other or with regard to the reference speed, i.e., whether they are, in each case, synchronous with respect to each other and stable. For this purpose, the possibilities include, for example, the determination of the difference between individual wheel speeds and the difference of individual wheel speeds with respect to the reference speed. For example, a small difference of a wheel speed from the reference speed is an indication that this speed could be suitable for the support of the reference speed. In addition, it is possible to ascertain an average wheel acceleration as a function of the speeds of the wheels, the wheel acceleration, for example, entering into the plausibility queries for recognizing load changes.

In addition, various plausibility queries can be realized on the basis of slip values lambdaij. For example, on the basis of individual slip values lambdaij, it can be established which wheels are performing in an unstable manner and thus are less well suited for the support of the reference speed. In addition, through comparing the sum of individual slip values lambdaij with a sum of the absolute values of the individual slip values, it is possible to establish whether the vehicle wheels are in a stable state or not.

Based on signals dfij, which indicates whether and which of wheel speed sensors 103ij is perhaps defective, it is possible to ascertain via queries the wheels whose speeds cannot provide support for the reference speed.

By comparing the oblique motion of a wheel with a preselected threshold value, it is also possible to establish whether the corresponding wheel is suitable for supporting the reference speed or not. In this context, the oblique motion of individual wheels can be ascertained with respect to the oblique motion of the front axle. By taking into account quantity axmod, which represents a quantity describing the acceleration of the vehicle, it can also be ascertained whether individual wheels are suited for supporting the reference speed or not.

The enumeration of the above plausibility queries does not represent a comprehensive enumeration and should not be construed as limiting. It is altogether conceivable to employ other plausibility queries. It is likewise conceivable to use various plausibility queries, in each case, for determining the selected wheel or for determining the two factors. In accordance with operating state Axy, it can therefore arise that the same or various plausibility queries are used for determining the selected wheel and the two factors.

In block 205, the quantity describing the speed of the vehicle, reference speed vref is ascertained. For this purpose, proceeding from block 204, speed vaus of the selected wheel as well as, via quantity Ki, and both first factor koax as well as second factor kovx are fed to block 205. From wheel speed sensors 103ij, block 205 receives signals nij, which are converted internally into quantities vij describing the speeds of the wheels. In addition, proceeding from block 206, quantities motzu describing the state of the engine, quantities Pij describing the wheel brake cylinder pressures, as well as a quantity Mfz describing the mass of the vehicle are fed to block 205. As quantities motzu describing the state of the vehicle, for example, the torque produced by the engine as well as the engine speed can be fed to block 205. Proceeding from the above-mentioned quantities, in the block, for example, in accordance with equations (1) or (1') through (5), reference speed vref of the vehicle is ascertained and is supplied both to block 204 as well as to block 206.

Proceeding from quantities Pij and vij, and taking into account quantity Mij, which is formed at least as a function of quantities motzu characterizing the state of the engine, in accordance with equation (1), quantities Fij describing the individual wheel forces are formed. In the event that quantities motzu describing the state of the engine are not available, quantities Fij in accordance with equation (1') are ascertained. Quantities Fij, in addition to quantity Mfz describing the mass of the vehicle, are included in the determination of quantity axmod described by equation (2), quantity axmod describing the acceleration of the vehicle.

Similarly, in block 205, in accordance with equation (4), quantity axoff is formed at least on the basis of speed vaus of the selected wheel. Based on equations (3) and (5), the reference speed of the vehicle is generated.

Alternatively, proceeding from block 206, a quantity alva can additionally be fed to block 205. This quantity describes the oblique motion in the front axle and can be taken into account in determining quantity axmod, which therefore leads to influencing the reference speed of the vehicle. As was already noted, quantity alva can be ascertained at least as a function of the vehicle speed and the transversal acceleration of the vehicle. The transversal acceleration necessary for this purpose is not depicted in FIG. 2.

Block 206 represents the controller used for the control system implemented in the vehicle. As input quantities, signals nij, produced using wheel speed sensors 103ij, as well as quantity Pvor, ascertained using sensor 108, are fed to block 206. In addition, proceeding from block 205, reference speed vref is fed to block 206. It obtains from the engine a quantity mot1, which can, for example, be the engine speed.

On the basis of the engine speed, a quantity, for example, which describes the torque produced by the engine or the drive torque, can be ascertained in block 206, and it can be fed to block 205 together with the engine speed as quantities motzu. In addition, in block 206, on the basis of quantity Pvor and trigger signals Aij ascertained in block 206 for actuators 105ij, trigger signals Aij describing, for example, the trigger times of the actuators, wheel brake cylinder pressures Pij are ascertained using a hydraulic model. Quantity Mfz describing the mass of the vehicle is ascertained in block 206 using a suitable estimation method at least as a function of wheel speeds nij or of the torque produced by the engine. In addition, the already mentioned signals Si are ascertained in block 206. Included in the determination of signals Si are at least quantities nij and quantities motzu characterizing the state of the engine. Similarly, quantities internal to the controller are taken into account, which, for example, contain information about controller engagements carried out by the control system.

In this context, reference should be made to a signal contained in signals Si, which is fed to block 203 and which informs it concerning the state of quantities axmod. This signal is formed at least as a function of engine speed nmot. For example, for this purpose, the engine speed is monitored for plausibility. If implausible engine speeds are detected, then this is an indication of the fact that, for example, the sensor used for determining the engine speed is defective. In this case, the quantities characterizing the state of the engine are not available, and quantity axmod is ascertained using quantities Fij in accordance with equation (1'). Consequently, using the signal contained in signals Si, block 203 is informed that quantity axmod cannot be used. On the other hand, if the engine speed is plausible, i.e., the quantities characterizing the state of the engine are available, then quantities Fij according to equation (1) are included in equation (2). In this case, block 203 is informed that quantity axmod can be used. Additionally, for monitoring the quantity describing the engine speed, a plausibility query regarding the error-free function of the data transmission system is available.

In addition, block 206 generates quantities lambdaij describing the slip of the wheels at least as a function of wheel speeds nij. Signals dfij, by which a fault in the corresponding wheel speed sensor 103ij is indicated, can be generated by block 206, for example, proceeding from quantities nij using plausibility queries.

In addition, in accordance with the implemented control system, for example, at least proceeding from signals nij and reference speed vref of the vehicle, block 206 generates trigger signals Aij for actuators 105ij and a signal mot2 for influencing the drive torque produced by engine 106. Through actuators Aij, the braking force acting on a respective wheel can be adjusted. By influencing the wheel forces and the drive torque produced by the engine, the slips of the individual wheels and the overall slip can be controlled. Depending on which type of control system is in use, block 206 can be fed further quantities required for controlling the overall slip, and block 206 can produce further quantities necessary for the controller.

Here it should be stated that the use indicated in the exemplary embodiment of the method and the device according to the present invention should not represent any delimitation. It is conceivable to use the method and the device according to the present invention in other systems in which the quantity describing the speed of the vehicle is required.

Figure 3:
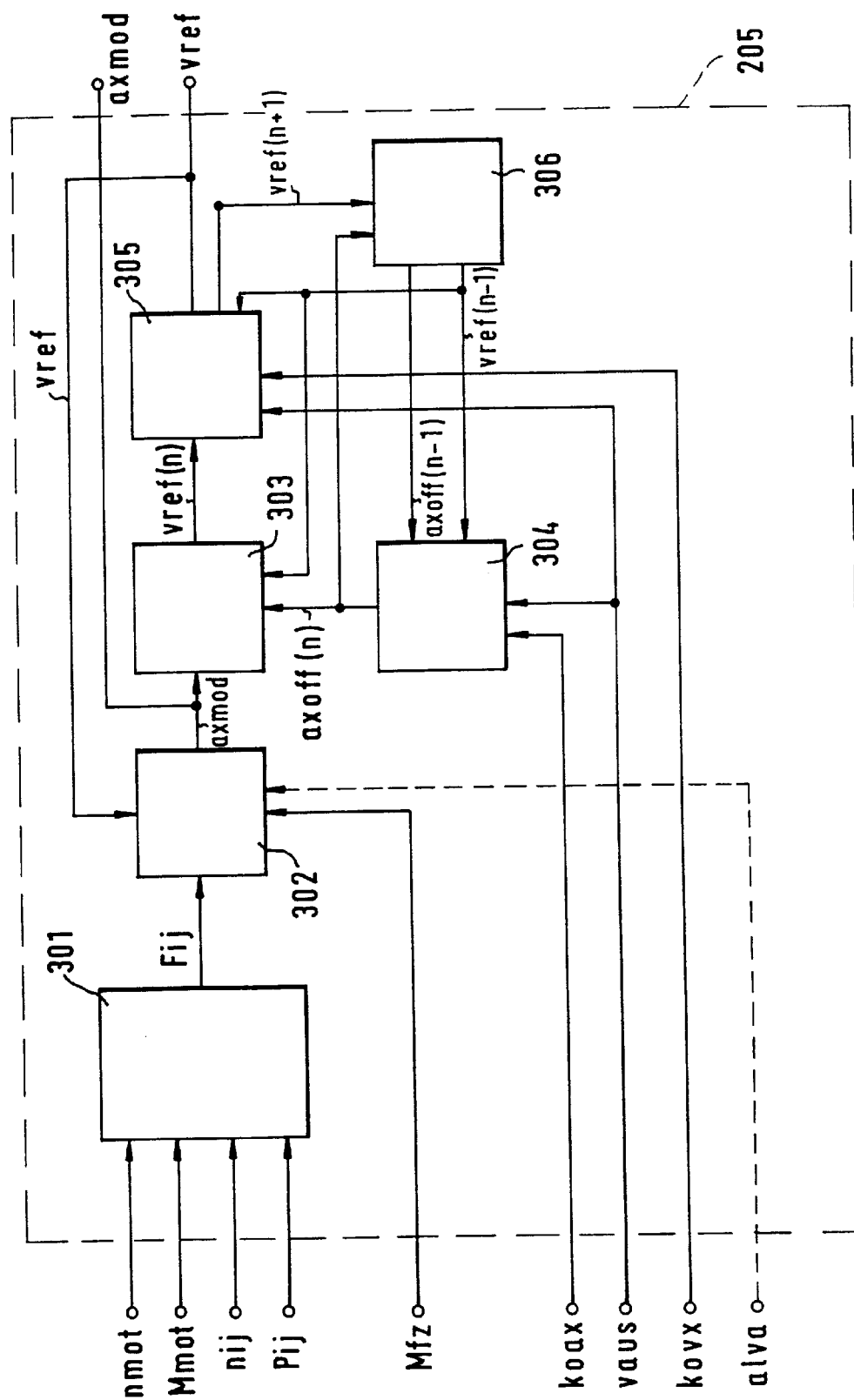
FIG. 3 illustrates the determination of a quantity and a reference speed of a vehicle according to the present invention.

In FIG. 3 the determination taking place in block 205 of reference speed vref of the vehicle and of quantity axmod is depicted in detail. In this context, essentially the equations (1) and (1') through (5) should be taken into account.

In a block 301, for example, in accordance with equation (1), proceeding from engine speed nmot or from torque Mmot produced by the engine, characterize the state of the engine and both of which are included in the determination of quantities Mij, as well as proceeding from wheel speeds nij, which are converted in block 301 into wheel speeds vij, and wheel brake cylinder pressures Pij, wheel forces Fij are constituted. These wheel forces Fij are fed to a block 302. If the quantities characterizing the state of the engine are not available, then the wheel forces are constituted in accordance with equation (1').

In addition, quantity Mfz describing the mass of the vehicle as well as reference speed vref are fed to block 302. As a function of the quantities fed to it, in block 302, for example, in accordance with the equation (2), quantity axmod describing the acceleration of the vehicle is constituted. Quantity axmod is fed to a block 303, and the quantity is also made available for further blocks located outside block 205.

Alternatively, quantity alva, which describes the oblique motion at the front axle of the vehicle, can be fed as an additional quantity to block 302. As a function of this quantity alva, a correction of quantity axmod can be carried out.

Initially on the basis of quantity axmod, value axmod(n) of this quantity is determined in block 303 for a time step n. Together with a value axoff(n) of quantity axoff and with a value vref(n−1) of the reference speed at time step n−1, value vref(n) of the reference speed is ascertained in block 303 for time step n, for example, an accordance with the equation (3). This value vref(n) is fed to a block 305.

In a block 304, the already mentioned value axoff(n) of quantity axoff is ascertained for time step n. For this purpose, factor koax, speed vaus of the selected wheel, value axoff(n−1) of quantity axoff, as well as value vref(n−1) of the reference speed for time step n−1 is fed to block 304. Proceeding from quantity vaus, value vaus(n) is initially ascertained for time step n in block 304. As a function of the quantities present in block 304, for example, in accordance with the equation (4), value axoff(n) of quantity axoff is determined for time step n. Value axoff(n) is fed both to block 303 as well as to block 306.

In addition to value vref(n) of the reference speed for time step n, speed vaus of the selected wheel, factor kovx, as well as value vref(n−1) of the reference speed for time step n−1 are fed to block 305. In block 305, initially proceeding from speed vaus, value vaus(n) of this quantity for time step n is ascertained in block 305. As a function of the quantities present in block 305, for example, in accordance with equation (5), value vref(n+1) of the reference speed is ascertained for time step n+1. This value vref(n+1) is fed to block 306. In addition, from block 305 a time-continuous signal vref is generated for the reference speed. This signal can be generated from time-discrete values vref(n+1), for example, using a retaining member. Signal or value vref is fed to block 302, and, in either case, it is made available for further blocks outside of block 205.

Values axoff(n) and vref (n+1) are stored in block 306. Value axoff(n) is therefore available for block 304 for a subsequent time step. Similarly, value vref(n+1) is available for blocks 303, 304, and 305, respectively, for a subsequent time step.

In the event of the initialization of the entire control system, which, for example, occurs at the beginning of a journey after turning the ignition key, suitable start values can be assigned to corresponding values necessary for the recursive formation of values axoff and vref.

FIG. 4, in a schematic representation in the form a matrix, depicts the determination taking place in block 203 of vehicle operating states Axy. Basically, operating states Axy are ascertained as a function of the speeds of the wheels.

A first criterion for determining each operating state Axy is formed on the basis of speeds vsi sorted according to quantity and reference speed vref. For this purpose, reference speed vref is compared to speeds vsi and is sorted accordingly. From this comparison, various groups of operating states result in the present exemplary embodiment 5. In the matrix representation selected, the groups correspond to the lines indicating the respective operating states A1y, A2y, A3y, A4y, and A5y.

To clearly ascertain each operating state Axy, a further, second criterion is necessary. The second criterion is supported essentially by quantity axmod describing the acceleration of the vehicle.

Essentially, as a function of quantity axmod, it is determined whether the vehicle at the time point at which reference speed vref is supposed to be ascertained is in a braked state, the "brake case," or in an accelerated state, the "drive case." The operating states in the "drive case" are designated using Ax1, and those of the "brake case" using Ax2.

To refine this query, further quantities can be cited such as the torques acting upon the wheels of the vehicle. These wheel torques are ascertained, for example, in block 206 at least as a function of wheel brake cylinder pressure Pij, or of the torque produced by the engine, and are fed to block 203 via signals Si.

If it cannot be clearly determined on the basis of quantity axmod whether the vehicle is in a braked or accelerated state, then, to describe the operating state of the vehicle, corresponding operating state Ax3 is selected from the "Other Cases."

For determining operating states Ax1, Ax2, and Ax3, quantity axmod describing the acceleration of the vehicle is required. In the event that quantity axmod cannot be used to determine these operating states, a corresponding operating state Ax4 is ascertained. Quantity axmod cannot be used if it is either defective or, as was already mentioned, is only partially described. These cases occur predominantly when, for example, the sensor by which the engine speed is determined fails or delivers defective signals, or when the data transmission system by which the necessary quantities are fed to block 205 for the determination of quantity axmod operates defectively or fails. Whether quantity axmod can be used for determining operating states Ax1, Ax2, and Ax3, or whether quantity axmod cannot be used, and therefore operating states Ax4 must be taken into account, is communicated to block 203 by a signal contained in signals Si.

It should be noted in this connection that for the method and the device according to the present invention there is no limitation as to whether for determining the operating states the order in which first criterion and then the second criterion is carried out.

Proceeding from FIG. 4, it should be mentioned with respect to block 204 that in respective operating states Axy, using already mentioned plausibility queries, a wheel is subject to determination for ascertaining the reference speed and the two factors necessary for evaluating the speed of the selected wheel.

The plausibility queries are structured for the "drive case" so that there is a tendency to select a wheel whose speed is smaller than the reference speed, which leads to a support of the reference speed from "below." On the other hand, in the "brake case," the plausibility queries are structured so that there is a tendency to select a wheel whose speed is larger than the reference speed, which occurs in a support of the reference speed from "above." The two factors, in this context, are ascertained so that their values are larger, the more suitable the selected wheel is for a support.

In operating states for which, based on the plausibility queries, it can be determined that none of the wheels is suitable for the determination of the reference speed, the two factors are selected at zero. Based on equations (4) and (5), it can be seen that in this case, both for quantity axoff as well as for quantity vref, no support takes place, and for both quantities the value for the subsequent time step is yielded from the value of the preceding time step. This results, in accordance with equation (6), in the value vref(n+1) of the reference speed being influenced, by a constant component axoff(n−1) and by a quantity component axmod(n).

If such an operating state is present, in which both the two factors are zero and quantity axmod cannot be used, then, in accordance with equation (6), value vref(n+1) of the reference speed is only influenced by constant component axoff (n−1) and thus is extrapolated as a function of this value. The consequence of this is that, in an unstable operating state the rise of the reference speed of the vehicle always results as a function of value axoff(n−1) of the last stable operating state. Therefore, for reference speed vref of the vehicle, various increases result as a function of the last stable operating state.

What is claimed is:

1. A method for determining a quantity describing a speed of a vehicle, comprising the steps of:

determining a speed for each one of at least two wheels of the vehicle;

determining a first quantity describing an acceleration of the vehicle as a function of at least each determined speed, determining an operating state of the vehicle in accordance with at least each determined speed and the first quantity;

selecting one of the at least two wheels in accordance with the operating state; and determining the quantity describing the speed of the vehicle as a function of at least the speed of the selected one of the at least two wheels.

2. A method for determining a quantity describing a speed of a vehicle, comprising the steps of:

determining a speed for each one of at least two wheels of the vehicle;

determining a first quantity describing an acceleration of the vehicle as a function of at least each determined speed, determining an operating state of the vehicle in accordance with at least each determined speed and the first quantity;

selecting one of the at least two wheels in accordance with the operating state;

determining the quantity describing the speed of the vehicle as a function of at least the speed of the selected one of the at least two wheels; and determining the quantity describing the speed of the vehicle at least as a function of a first component and a second component, the first component describing the speed of the vehicle, and the second component describing the acceleration of the vehicle.

3. The method according to claim 2, further comprising the step of:

determining the first component as a function of at least a preceding value of the quantity describing the speed of the vehicle and the speed of the selected one of the at least two wheels, the speed of the selected one of the at least two wheels being evaluated using a first factor.

4. The method according to claim 2, further comprising the step of:

determining the second component as a function of at least the first quantity describing the acceleration of the vehicle, the speed of the selected one of the at least two wheels, and a second quantity describing the acceleration of the vehicle, the speed of the selected one of the at least two wheels being evaluated using a second factor.

5. A method for determining a quantity describing a speed of a vehicle, comprising the steps of:

determining a speed for each one of at least two wheels of the vehicle;

determining a first quantity describing an acceleration of the vehicle as a function of at least each determined speed, determining an operating state of the vehicle in accordance with at least each determined speed and the first quantity;

selecting one of the at least two wheels in accordance with the operating state;

determining the quantity describing the speed of the vehicle as a function of at least the speed of the selected one of the at least two wheels;

determining a brake pressure acting on each one of the at least two wheels; and determining a plurality of quantities characterizing a state of an engine of the vehicle, wherein the first quantity is further determined as a function of at least each determined brake pressure and the plurality of quantities characterizing the state of the engine.

6. The method according to claim 5, wherein the step of determining the plurality of quantities characterizing the state of the engine includes the step of:

determining one of a speed of the engine and a torque produced by the engine.

7. The method according to claim 2, further comprising the steps of:

determining the first component as a function of at least a preceding value of the quantity describing the speed of the vehicle and the speed of the selected one of the at least two wheels, the speed of the selected one of the at least two wheels being evaluated using a first factor;

determining the second component as a function of at least the first quantity describing the acceleration of the vehicle, the speed of the selected one of the at least two wheels, and a second quantity describing the acceleration of the vehicle, the speed of the selected one of the at least two wheels being evaluated using a second factor; and determining one of the first factor and the second factor as a function of at least the operating state of the vehicle.

8. The method according to claim 7, further comprising the step of:

performing a plurality of plausibility queries at least for a part of the operating state of the vehicle to determine one of the first factor and the second factor.

9. A method for determining a quantity describing a speed of a vehicle, comprising the steps of:

determining a speed for each one of at least two wheels of the vehicle;

determining a first quantity describing an acceleration of the vehicle as a function of at least each determined speed, determining an operating state of the vehicle in accordance with at least each determined speed and the first quantity;

selecting one of the at least two wheels in accordance with the operating state;

determining the quantity describing the speed of the vehicle as a function of at least the speed of the selected one of the at least two wheels;

determining a plurality of quantities characterizing a state of an engine of the vehicle; and determining a second quantity as a function of the plurality of quantities characterizing the state of the engine, wherein the operating state of the vehicle is determined by using the second quantity.

10. A method for determining a quantity describing a speed of a vehicle, comprising the steps of:

determining a speed for each one of at least two wheels of the vehicle;

determining a first quantity describing an acceleration of the vehicle as a function of at least each determined speed, determining an operating state of the vehicle in accordance with at least each determined speed and the first quantity;

selecting one of the at least two wheels in accordance with the operating state; and determining the quantity describing the speed of the vehicle as a function of at least the speed of the selected one of the at least two wheels; wherein the operating state of the vehicle is determined on the basis of each speed of the at least two wheels by performing the steps of:

sorting each speed of the at least two wheels according to a magnitude of a respective one of each speed, and comparing each sorted speed to the quantity describing the speed of the vehicle.

11. A method for determining a quantity describing a speed of a vehicle, comprising the steps of:

determining a speed for each one of at least two wheels of the vehicle;

determining a first quantity describing an acceleration of the vehicle as a function of at least each determined speed, determining an operating state of the vehicle in accordance with at least each determined speed and the first quantity;

selecting one of the at least two wheels in accordance with the operating state;

determining the quantity describing the speed of the vehicle as a function of at least the speed of the selected one of the at least two wheels; and for at least one part of the operating state of the vehicle, determining the selected wheel via a plurality of plausibility queries.

12. A method for determining a quantity describing a speed of a vehicle, comprising the steps of:

determining a speed for each one of at least two wheels of the vehicle;

determining a first quantity describing an acceleration of the vehicle as a function of at least each determined speed, determining an operating state of the vehicle in accordance with at least each determined speed and the first quantity;

selecting one of the at least two wheels in accordance with the operating state;

determining the quantity describing the speed of the vehicle as a function of at least the speed of the selected one of the at least two wheels; and performing the plurality of plausibility queries using at least one of each determined speed of the at least two wheels, a plurality of quantities describing slip values of the at least two wheels, and the first quantity.

13. The method according to claim 8, further comprising the step of:

performing the plurality of plausibility queries using at least one of each determined speed of the at least two wheels, a plurality of quantities describing slip values of the at least two wheels, and the first quantity.

14. A device for determining a quantity describing a speed of a vehicle, comprising:

a first device for determining a speed for each one of at least two wheels of the vehicle;

a second device for determining a first quantity describing an acceleration of the vehicle as a function of at least each determined speed for the at least two wheels;

a third device for determining an operating state of the vehicle in accordance with at least each determined speed and the first quantity;

a fourth device for selecting one of the at least two wheels in accordance with the operating state of the vehicle; and a fifth device for determining the quantity describing the speed of the vehicle as a function of at least the speed of the selected one of the at least two wheels.

* * * * *